(12) United States Patent
Hayashi et al.

(10) Patent No.: US 8,783,037 B2
(45) Date of Patent: Jul. 22, 2014

(54) ELECTRICITY-GENERATING SYSTEM

(75) Inventors: Ichiroku Hayashi, Ueda (JP); Yutaka Yoshida, Nagano (JP)

(73) Assignees: Ichiroku Hayashi, Nagano (JP); Yutaka Yoshida, Nagano (JP); Yoichiro Kuroiwa, Tokyo (JP); Masakiyo Hashizume, Nagano (JP)

( * ) Notice: Subject to any disclaimer, the term of this patent is extended or adjusted under 35 U.S.C. 154(b) by 355 days.

(21) Appl. No.: 13/347,104

(22) Filed: Jan. 10, 2012

(65) Prior Publication Data

US 2013/0175807 A1 Jul. 11, 2013

(51) Int. Cl.
*F01K 13/00* (2006.01)

(52) U.S. Cl.
USPC .............................. 60/676; 60/670

(58) Field of Classification Search
USPC .................... 60/670, 676; 290/1 R
See application file for complete search history.

(56) References Cited

U.S. PATENT DOCUMENTS

| | | | |
|---|---|---|---|
| 2,653,447 A * | 9/1953 | Heller | 60/655 |
| 4,492,085 A * | 1/1985 | Stahl et al. | 60/649 |
| 5,000,099 A * | 3/1991 | Dickinson | 110/238 |
| 5,050,375 A * | 9/1991 | Dickinson | 60/39.12 |
| 5,531,073 A * | 7/1996 | Bronicki et al. | 60/641.2 |
| 2003/0167769 A1 * | 9/2003 | Bharathan et al. | 60/676 |
| 2010/0011778 A1 | 1/2010 | Knight et al. | |

FOREIGN PATENT DOCUMENTS

| | | |
|---|---|---|
| HK | 1128384 A | 10/2009 |
| JP | 8-218814 A | 8/1996 |
| JP | 2003-253267 A | 9/2003 |

OTHER PUBLICATIONS

Extended European Search Report dated Apr. 25, 2014 for corresponding European Patent Application No. 11 00 3699.

* cited by examiner

*Primary Examiner* — Hoang Nguyen
(74) *Attorney, Agent, or Firm* — Sughrue Mion, PLLC

(57) ABSTRACT

An electricity-generating system of the invention which includes the following: a carbonization apparatus for carbonizing a carbonization source to form a carbonized product; a heat recovery steam generator for producing first steam through heat exchange with the heat exhausted from the carbonization apparatus; a carbonized fuel steam generator which employs the carbonized product serving as a fuel; a mixing header for mixing the first steam and a second steam produced by the carbonized fuel steam generator, which steams are fed thereinto, to thereby discharge a steam mixture having a uniform pressure; an electricity-generating apparatus for generating electricity by means of the steam mixture discharged from the mixing header as an actuating source; and an electricity-storing apparatus for storing the electricity generated by the electricity-generating apparatus.

6 Claims, 3 Drawing Sheets

ELECTRICITY-GENERATING SYSTEM

BACKGROUND OF THE INVENTION

1. Field of the Invention

The present invention relates to an electricity-generating system employing a carbonization apparatus.

2. Background Art

In recent years, extensive studies have been carried out for gaining more energy from limited resources and reducing the amount of carbon dioxide generated during recovery of energy.

At present, valuable energy sources such as heat and electricity are known to be more effectively recovered through combustion of a carbonized substance as opposed to a non-carbonized substance. Also, such a carbonized substance is known to reduce the amount of carbon dioxide generated during combustion.

Hitherto, a variety of carbonization apparatuses have been developed. For example, Japanese Patent Application Laid-Open (kokai) No. 2003-253267 discloses a carbonization apparatus having a rotary kiln of a dual-shell structure, which attains excellent carbonization efficiency through passing air upward through a raw material bed.

However, heat exhausted from the carbonization apparatus is merely employed as an in-situ heat source, and not all the heat energy can be effectively utilized.

SUMMARY OF THE INVENTION

In view of the foregoing, an object of the present invention is to provide an electricity-generating system which can effectively utilize heat energy exhausted from a carbonization apparatus and which can reduce the amount of carbon dioxide generated.

In a first mode of the present invention for attaining the above object, there is provided an electricity-generating system comprising:

a carbonization apparatus for carbonizing a carbonization source to form a carbonized product;

a heat recovery steam generator for producing first steam through heat exchange with the heat exhausted from the carbonization apparatus;

a carbonized fuel steam generator which employs the carbonized product serving as a fuel;

a mixing header for mixing the first steam and second steam produced by the carbonized fuel steam generator, which steams are fed thereinto, to thereby discharge a steam mixture having a uniform pressure;

an electricity-generating apparatus for generating electricity by means of the steam mixture discharged from the mixing header as an actuating source; and an electricity-storing apparatus for storing the electricity generated by the electricity-generating apparatus.

According to the first mode, the first steam produced through heat exchange with the heat energy provided by the carbonization apparatus, and the second steam produced by the carbonized fuel steam generator employing, as a fuel, the carbonized product produced by the carbonization apparatus are fed into the mixing header. The thus-obtained steam mixture having a uniform pressure is discharged from the mixing header and employed in the electricity-generating apparatus as an actuating source, whereby electricity is generated. Thus, the exhaust gas of the carbonization apparatus can be efficiently utilized for electricity generation, whereby effective utilization of energy can be realized, and the amount of carbon dioxide generated can be reduced.

A second mode of the present invention is drawn to a specific embodiment of the electricity-generating system according to the first mode, wherein the first steam is produced through heat exchange between water and the gas exhausted from the carbonization apparatus.

A third mode of the present invention is drawn to a specific embodiment of the electricity-generating system according to the first or second mode, wherein the second steam is produced through heat exchange between water and the exhaust gas exhausted from the carbonized fuel steam generator.

A fourth mode of the present invention is drawn to a specific embodiment of the electricity-generating system according to any of the first to third modes, wherein the mixing header has an internal space serving as a buffer chamber where the first steam and the second steam fed to the mixing header are temporarily stored.

A fifth mode of the present invention is drawn to a specific embodiment of the electricity-generating system according to any of the first to fourth modes, wherein the electricity-generating apparatus generates electricity via a steam turbine.

A sixth mode of the present invention is drawn to a specific embodiment of the electricity-generating system according to any of the first to fifth modes, wherein the carbonized fuel steam generator employs, as a raw material, the carbonized product produced by the carbonization apparatus.

According to the electricity-generating system of the present invention, electricity can be efficiently generated by means of a carbonization apparatus, and the amount of carbon dioxide generated can be reduced.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

An embodiment of the present invention will next be described in detail with reference to the drawings.

Figure 1:
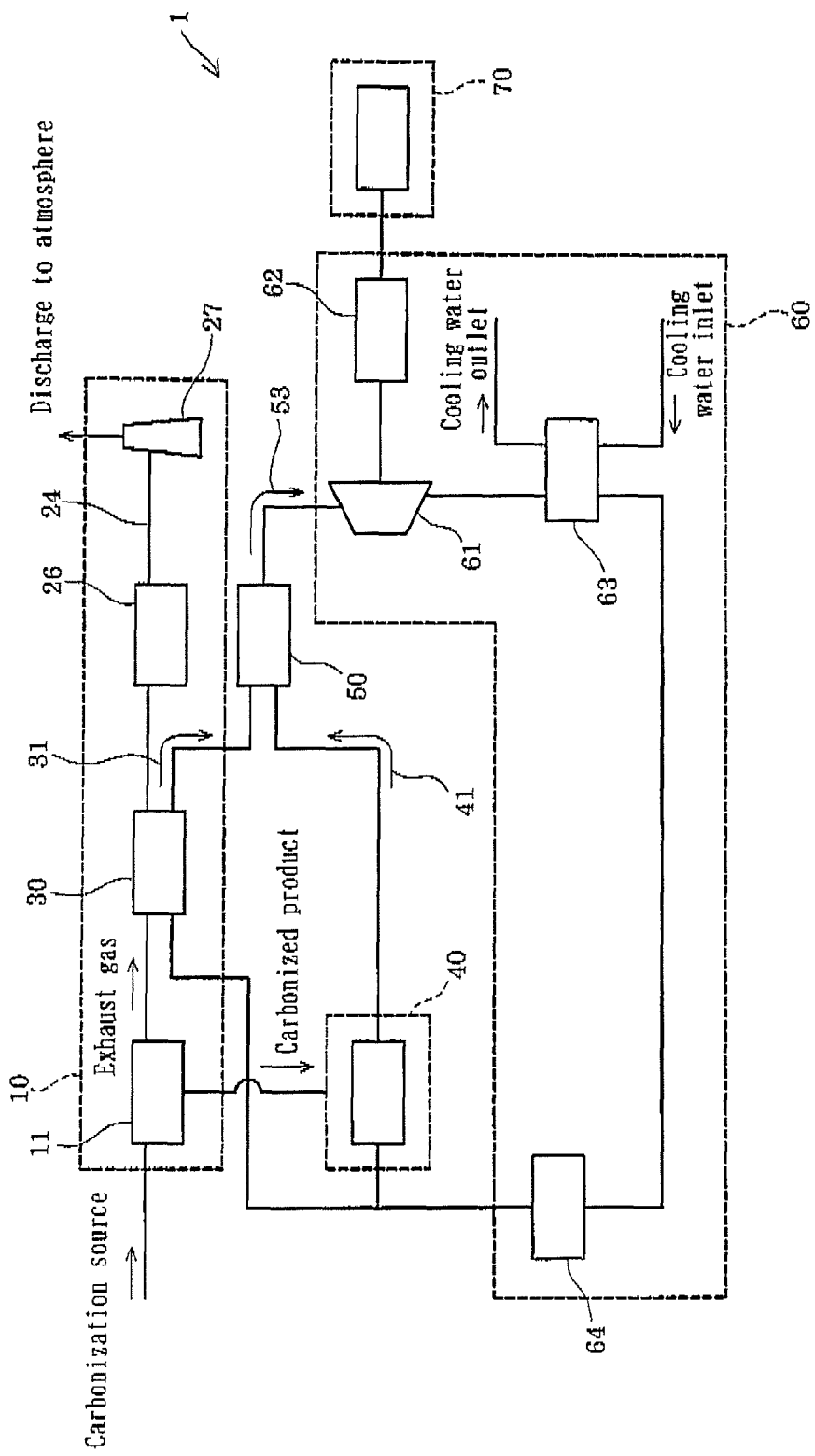
FIG. 1 is a schematic diagram of an embodiment of the electricity-generating system according to the present invention.
Figure 2:
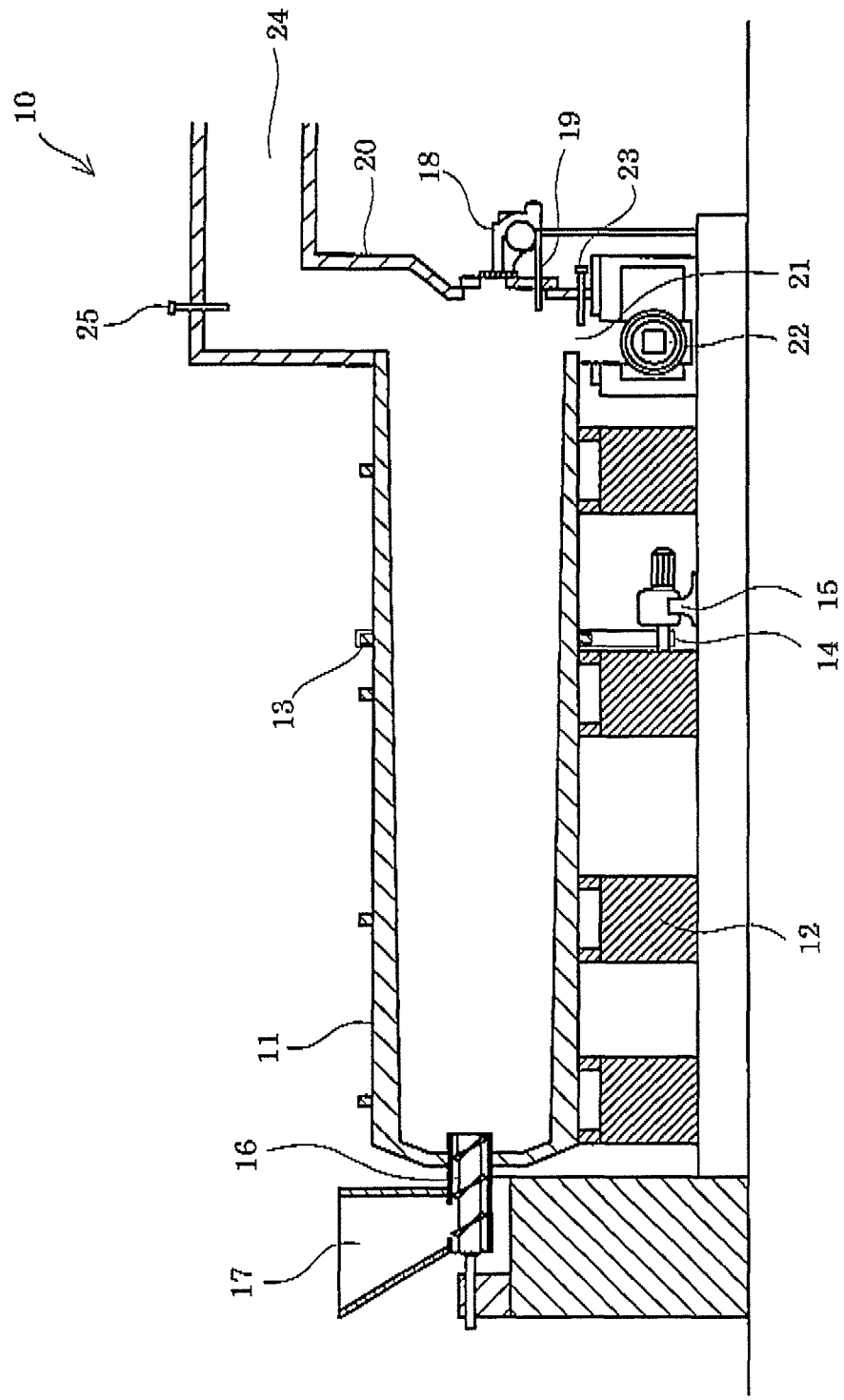
FIG. 2 is a schematic representation of an embodiment of a carbonization furnace according to the present invention.
Figure 3:
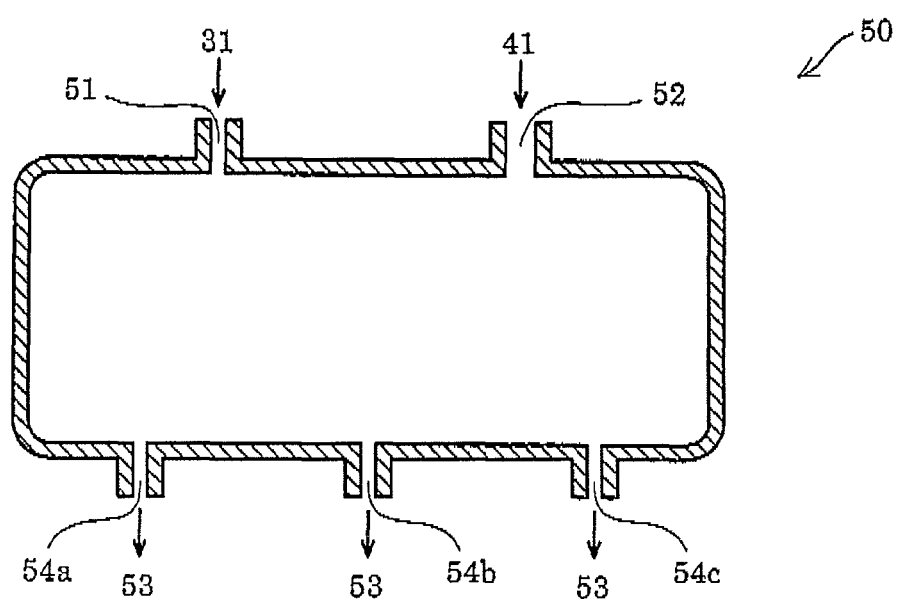
FIG. 3 is a schematic representation of an embodiment of a mixing header according to the present invention.

FIG. 1 is a schematic diagram of an embodiment of the electricity-generating system according to the present invention. FIG. 2 is a schematic representation of an embodiment of a carbonization furnace according to the present invention. FIG. 3 is a schematic representation of an embodiment of a mixing header according to the present invention.

As shown in FIG. 1, an electricity-generating system 1 according to one embodiment of the present invention includes:

a carbonization apparatus 10 for pyrolizing a carbonization source into a carbonized product and an exhaust gas;

a heat recovery steam generator 30 for carrying out heat exchange of the heat exhausted from the carbonization apparatus 10, to thereby produce first steam 31;

a carbonized fuel steam generator 40 for burning the carbonized product formed through carbonization;

a mixing header 50 for mixing first steam 31 produced by the heat recovery steam generator 30 and second steam 41 produced by the carbonized fuel steam generator 40, which steams are fed thereinto, to thereby discharge a steam mixture having a uniform pressure;

an electricity-generating apparatus 60, which is a steam turbine electricity-generating apparatus for generating electricity by means of the steam mixture as an actuating source; and an electricity-storing apparatus 70 for storing the generated electricity.

As shown in FIG. 2, the carbonization apparatus 10 has a furnace body 11, which is a vessel for burning a carbonization source. The furnace body 11 has a hollow cylindrical shape in which one end has a minimum inner diameter and the diameter gradually increases toward the other end. The furnace body is laterally and rotatably placed on a plurality of supports 12. On the peripheral surface of the furnace body 11, gear parts 13 are disposed. Each gear part 13 is engaged with a drive chain 14, which is driven by means of a drive motor 15.

At the opening of the end of the furnace body 11 having a minimum diameter, a screw conveyer 16 for feeding a carbonization source into the furnace body 11 is disposed. The screw conveyer 16 is equipped with a material feeding hopper 17 for feeding the carbonization source. The other end of the furnace body 11 remains open. A cover member 20 equipped with a burner 18 and a fan 19 is placed so as to face opposite the counter end. Under the space between the opening end of the furnace body 11 and the burner 18, a take-out port 21 for collecting the carbonized product is disposed. Under the take-out port 21, a screw conveyer 22 is disposed so as to discharge the carbonized product to the outside. The take-out port 21 is equipped with a thermometer 23 for measuring the temperature of the carbonized product.

The upper section of the space between the opening end of the furnace body 11 and the burner 18 serves as a discharge flow path 24 for discharging the exhaust gas. An exhaust gas thermometer 25 for measuring the exhaust gas is disposed at the upper section.

As shown in FIG. 1, a heat recovery steam generator 30 is disposed in the discharge flow path 24. The exhaust gas cooled by means of the heat recovery steam generator 30 passes through a dust collector 26 and is discharged through a stack 27 to the atmosphere.

In the above carbonization apparatus 10, when a carbonization source such as construction wood waste or timber obtained from forest thinning is continuously fed thereinto through the material feed hopper 17, the screw conveyer 16 rotates, whereby the carbonization source is fed into the furnace body 11. Then, the carbonization source which has been fed into the furnace body 11 is transferred from one end (small-diameter end) to the other end (large-diameter end) through rotation of the (tapered-shape) furnace body 11 having a gradually increasing inner diameter, by means of the drive motor 15. Meanwhile, combustion flame is caused to transfer from the large-diameter end to the small-diameter end of the furnace body 11 by means of the burner 18 and the fan 19. Through the above procedure, the carbonization source is burnt for carbonization under complete combustion conditions while being moved from the small-diameter end to the large-diameter end. The thus-produced carbonized product is discharged through the take-out port 21 and continuously cooled and transferred to the outside by means of the screw conveyer 22. Notably, the thus-obtained carbonized product is employed as a fuel for the carbonized fuel steam generator 40.

The exhaust gas which has been generated during carbonization and which has been discharged through the discharge flow path 24 is transferred into the heat recovery steam generator 30, and the thus-heat-exchanged exhaust gas is discharged through the stack.

In other words, the heat recovery steam generator 30 performs heat exchange between water and the exhaust gas in the discharge flow path 24, to thereby produce the first steam 31.

The carbonized fuel steam generator 40 is a boiler which employs a carbonized product serving as a fuel. In addition to the carbonized product produced by the carbonization apparatus 10, other fuels such as coal may be additionally employed in accordance with needs. The carbonized fuel steam generator 40 produces the second steam 41 through heat exchange between water and the combustion exhaust gas.

The aforementioned first steam 31 and second steam 41 are transferred to the mixing header 50.

As shown in FIG. 3, the mixing header 50, having a generally hermetic hollow cylindrical shape, is provided with a first inlet 51 for feeding the first steam 31 to the header, a second inlet 52 for feeding the second steam 41 to the header, and a plurality of (three in FIG. 3) discharge outlets 54*a* to 54*c* for discharging a steam mixture 53 obtained by mixing the first steam 31 fed through the first inlet 51 with the second steam 41 fed through the second inlet 52. The discharge outlets 54*a* to 54*c* are connected to a steam turbine 61.

The mixing header 50 is a pressure vessel having an internal Space and serves as a buffer chamber, where the first steam 31 and the second steam 41 fed thereto through the first inlet 51 and the second inlet 52 are temporarily stored. Then, the steam mixture 53 is discharged through the discharge outlets 54*a* to 54*c* at a virtually constant flow rate. The opening sizes and other dimensions of the first inlet 51, the second inlet 52, and the discharge outlets 54*a* to 54*c* are appropriately adjusted in accordance with the flow rates of the first steam 31 and the second steam 41. Therefore, even when the pressures of the first steam 31 and the second steam 41; in particular, the pressure of the first steam 31, are variable, the steam mixture 53 having a virtually constant pressure is fed to the steam turbine 61.

As shown in FIG. 1, the electricity-generating apparatus 60 includes the steam turbine 61 which rotates by means of the steam mixture 53 serving as an actuating source; the electricity-generator 62 for generating electricity through rotation of the steam turbine, the electricity-generator being connected to the steam turbine 61; a condenser 63 for cooling the vapor employed for the rotation of the steam turbine 61; and a water-feed pump 64 for feeding to the heat recovery steam generator 30 and/or carbonized fuel steam generator 40 the water generated by the condenser 63.

The electricity generated by the steam mixture 53 is stored in the electricity-storing apparatus 70. The electricity stored in the electricity-storing apparatus 70 is utilized for driving the apparatuses and devices in the system or in a chargeable battery, in accordance with needs.

According to the electricity-generating system 1 shown in FIG. 1, a carbonization source such as construction wood waste or timber obtained from forest thinning is carbonized through the carbonization apparatus 10, to thereby produce a carbonized product, and the exhaust gas is heat-exchanged through the heat recovery steam generator 30, to thereby produce the first steam 31. The carbonized product provided by the carbonization apparatus 10 is employed as a fuel in the carbonized fuel steam generator 40, to thereby form the second steam 41 through heat exchange.

The first steam 31 and the second steam 41 produced through the heat recovery steam generator 30 and the carbonized fuel steam generator 40 are mixed together in the mixing header 50, and the thus-produced steam mixture 53 is fed to the steam turbine 61 for generating electricity.

As described above, the electricity-generating system 1 of this embodiment employing the carbonization apparatus 10 generates electricity through employment of the steam mixture 53 of the first steam 31 and the second steam 41 as an actuating source of the steam turbine 61. The energy obtained by the system is three times or more that obtained through generation of electricity by use of coal.

Meanwhile, a conventional electricity generation system which generates electricity through burning a carbonized product obtained by a carbonization apparatus provides an energy of about 4,000 cal from 1 g of dried plant matter. In contrast, according to the electricity-generating system of the present invention, an energy of about 19,000 cal can be provided under the same conditions.

In the case of generation of electricity of 1,000 kW, the electricity-generating system of the present invention requires a fuel carbonized product in an amount of 790 kg. The total carbon dioxide emission amount of the electricity-generating system is 150 kg corresponding to the amount of carbon dioxide emitted during burning of the carbonized product, which is calculated by setting off the amount of carbon dioxide emitted during production of the carbonized product against the amount of carbon dioxide absorbed by the plant in the growth stage. The greenhouse gas factor of the electricity-generating system is 0.19 kg/$CO_2$/kg. In contrast, in the case of generation of electricity of 1,000 kW by use of coal, coal is required in an amount of 2,020 kg, and the total carbon dioxide emission amount is 5,138 kg. The greenhouse gas factor is 34.3 times that of the electricity-generating system of the present invention. Also, in the case of generation of electricity of 1,000 kW by use of heavy oil, heavy oil is required in an amount of 1,479 kg, and the total carbon dioxide emission amount is 4,008 kg. The greenhouse gas factor is 26.7 times that of the electricity-generating system of the present invention.

As described above, according to the electricity-generating system 1 of the present invention, the exhaust gas of the carbonization apparatus 10 is heat-exchanged to produce the first steam 31, which is then mixed in the mixing header 50 with the second steam 41 produced by the carbonized fuel steam generator 40. The thus-obtained steam mixture is employed for actuating the electricity-generating apparatus 60. Therefore, a considerably large amount of energy can be obtained as compared with a conventional electricity-generating system, and the amount of carbon dioxide emission can be remarkably reduced.

Thus, according to the electricity-generating system 1 of the present invention, steams supplied from different heat sources can be mixed in the mixing header 50, to thereby provide the steam mixture 53, which has not been attained by a conventional technique. The thus-obtained steam mixture is employed as an actuating source of the electricity-generating apparatus 60, whereby the aforementioned advantageous effects can be attained.

In this embodiment, a steam turbine electricity-generating apparatus is employed as an example of the electricity-generating apparatus 60. However, no particular limitation is imposed on the electricity-generating apparatus 60, so long as it employs steam as an actuating source.

Through storing in the electricity-storing apparatus 70 the electricity generated by the electricity-generating apparatus 60, the electricity can be employed in the apparatuses and devices in the system in accordance with needs, leading to effective utilization of energy.

The present invention can be applied to various industrial fields relating to the electricity-generating system which employs, as a carbonization source, an organic substance such as construction wood waste or timber obtained from forest thinning.

What is claimed is:

1. An electricity-generating system comprising:
    a carbonization apparatus for carbonizing a carbonization source to form a carbonized product;
    a heat recovery steam generator for producing first steam through heat exchange with the heat exhausted from the carbonization apparatus;
    a carbonized fuel steam generator which employs the carbonized product serving as a fuel;
    a mixing header for mixing the first steam and second steam produced by the carbonized fuel steam generator, which steams are fed thereinto, to thereby discharge a steam mixture having a uniform pressure;
    an electricity-generating apparatus for generating electricity by means of the steam mixture discharged from the mixing header as an actuating source; and
    an electricity-storing apparatus for storing the electricity generated by the electricity-generating apparatus.

2. An electricity-generating system according to claim 1, wherein the first steam is produced through heat exchange between water and the gas exhausted from the carbonization apparatus.

3. An electricity-generating system according to claim 1, wherein the second steam is produced through heat exchange between water and the exhaust gas exhausted from the carbonized fuel steam generator.

4. An electricity-generating system according to claim 1, wherein the mixing header has an internal space serving as a buffer chamber where the first steam and the second steam fed to the mixing header are temporarily stored.

5. An electricity-generating system according to claim 1, wherein the electricity-generating apparatus generates electricity via a steam turbine.

6. An electricity-generating system according to claim 1, wherein the carbonized fuel steam generator employs, as a raw material, the carbonized product produced by the carbonization apparatus.

* * * * *